United States Patent [19]

Law et al.

[11] Patent Number: 5,347,566
[45] Date of Patent: Sep. 13, 1994

[54] RETROFIT SUBSCRIBER LOOP CARRIER SYSTEM WITH IMPROVED PERFORMANCE MONITORING AND REMOTE PROVISIONING

[75] Inventors: Edward K. Law, Santa Clara; Yick M. Chan, Palo Alto, both of Calif.

[73] Assignee: Digital Transmission Systems, Inc., Norcross, Ga.

[21] Appl. No.: 781,466

[22] Filed: Oct. 23, 1991

[51] Int. Cl.$^5$ .............................. H04M 1/24
[52] U.S. Cl. ..................... 379/27; 379/333
[58] Field of Search .............. 379/1, 27, 32, 171, 379/231, 6, 333, 334, 399

[56] References Cited

U.S. PATENT DOCUMENTS

| | | | |
|---|---|---|---|
| 3,870,828 | 3/1975 | Saliga . | |
| 3,920,920 | 11/1975 | Lager et al. . | |
| 4,245,340 | 1/1981 | Landry | 370/111 |
| 4,271,509 | 6/1981 | Brolin | 370/110 |
| 4,354,265 | 10/1982 | Nyberg et al. | 370/111 |
| 4,653,043 | 3/1987 | Brady et al. | 379/25 |
| 4,849,977 | 7/1989 | Baun, Jr. et al. | 371/49 |
| 4,878,048 | 10/1989 | Gottesman et al. | 379/27 |
| 4,901,344 | 2/1990 | Monette et al. | 379/93 |
| 4,987,573 | 1/1991 | Monette et al. | 370/111 |
| 5,018,184 | 5/1991 | Abrams et al. | 379/6 |
| 5,054,050 | 10/1991 | Burke et al. | 379/27 |
| 5,111,497 | 5/1992 | Bliven et al. | 379/27 |

FOREIGN PATENT DOCUMENTS 1161973 2/1984 Canada .
0356012 2/1990 European Pat. Off. .

OTHER PUBLICATIONS

Cho et al., *The Bell System Tech. J.* (1982) 61:2677-2702.
Luniewicz et al., *The Bell System Tech. J.* (1984) 63:2283-2331.
Morgen et al., *The Bell System Tech. J.* (1984) 63:2363-2387.
Cho et al., *IEEE Tran. on Comm.* (1982) C-30:20-16-2021.
Nemchik et al., *IEEE ICC83 Proc.* (1983) pp. A3.2-.1-A3.2.4.
Greco et al., *IEEE ICC83 Proc.* (1983) pp. A3.1-.1-A3.1.9.

Primary Examiner—James L. Dwyer
Assistant Examiner—Ahmad F. Matar
Attorney, Agent, or Firm—Townsend and Townsend Khourie and Crew

[57] ABSTRACT

An improved subscriber line carrier (SLC) with enhanced performance for monitoring and remote provisioning. Communication between the new control unit and new channel units (such as universal remote provisionable channel unit) utilizes a back plane read disable bus line (RNDIS). Serial digital signals are modulated within a high level on the read disable bus line for transmission of information between control unit and the new channel units.

16 Claims, 10 Drawing Sheets

Microfiche Appendix Included
(152 Microfiche, 3 Pages)

RETROFIT SUBSCRIBER LOOP CARRIER SYSTEM WITH IMPROVED PERFORMANCE MONITORING AND REMOTE PROVISIONING

MICROFICHE APPENDIX

This patent contains microfiche appendices 1, 2 and 3, including 3 sheets of fiche totaling 152 frames.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of telecommunications equipment. More specifically, in one embodiment the invention provides an improved method and device for providing control, provisioning, testing, and monitoring of a subscriber loop carrier (SLC) system.

Among the best known SLC systems is one manufactured by AT&T and known as the SLC-96. The SLC-96 is a digital subscriber carrier system that provides service for up to 96 subscriber lines. Such systems use time division multiplexing techniques for transmission of signals.

Figure 1:
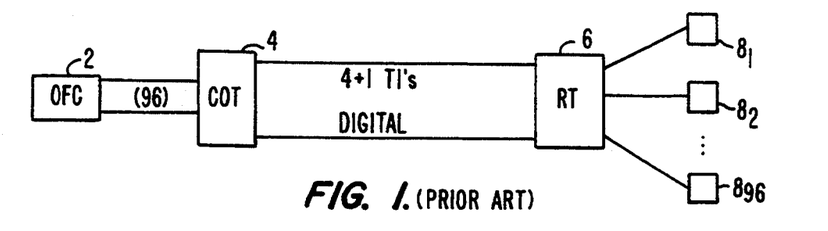
FIG. 1 is a an illustration of a prior art system.

FIG. 1 is an overall block diagram of the basic SLC-96 system. As shown, the system provides for the use of analog or digital central office switches 2 which transmit up to 96 analog signals to COT 4. The COT provides appropriate conversion to T1 digital format for transmission over 4 T1 lines to SLC-96 remote terminal 6, which transmits up to 96 analog telephone signals to subscriber equipment 8. The SLC-96 system is described in detail in a variety of publications including, for example, Luniewicz et al., "The SLC-96 Subscriber Loop Carrier System," *AT&T Bell Laboratories Technical Journal* (1984) Vol. 63, which is incorporated herein by reference in its entirety for all purposes.

While meeting with substantial success, systems such as the SLC-96 have also met with certain limitations. For example, parameter selections of the channel units (CU) on the RT are implemented under the control of conventional microswitches, dipswitches, or the like. This causes particular difficulty because resetting of many parameters requires physical removal of the board containing these switches, followed by manual resetting. This causes difficulties because of the time and labor required to perform these modifications, and the like. Such parameters which are currently implemented in this manner include, for example, transmission level changes, slope equalizer changes, impedance changes, functional type changes, and the like. Further, remote monitoring of the RT is difficult. Still further, it would be desirable to control many of these functions from a centralized remote location and to be able to obtain these improvements without complete replacement of the system.

From the above it is seen that a retrofit to provide an improved subscriber line carrier system is needed.

SUMMARY OF THE INVENTION

An improved system for upgrading the functionality of the SLC-96 and other similar systems is provided by virtue of the present invention. The invention enables the addition of communication links between a control unit and a channel unit, without the need to provide additional lines on an RT backplane. Instead, the improved system disclosed herein is implemented easily and cost efficiently through replacement of channel bank common cards and channel units in which increased functionality is desired. The system uses existing backplane connections on the RT.

The SLC resides between a telephone central office and subscribers having telephone service served by a switch at the central office. As the SLC needs to be upgraded so that a communications channel data path is established between the central office and each channel unit to provide configuration-type messages, text access information, signaling status (on hook/off hook), inventory information, etc., a set of common cards are installed in the SLC RT. The present invention provides increased capability while the backplane of the remote channel bank does not need to be modified to provide extra communication channels between the common cards and the channel units.

The backplane of the conventional RT in a SLC provides for several bus lines to provide communication with the CUs. The bus lines include, a read disable (RNDIS) bus line, a pulse amplitude modulation (PAM) bus line, a clock (CLK) bus line, an A/B signaling line, and a pulse modulation (PCM) line. The preferred embodiment of the invention herein utilizes the RNDIS bus line to transmit information between the common cards and the channel units, while remaining compatible with the old channel units.

The RNDIS bus' normal function is to disable all CUs served by a particular failed T1 line. This function was previously achieved by providing the RNDIS bus with two voltage levels, e.g., a LOW voltage level and HIGH voltage level, with the HIGH voltage level being used to maintain all CUs active, and a LOW voltage level indicating to logic on the CUs to disable themselves since a failure condition exists. According to the invention, the RNDIS bus is maintained within a defined HIGH (inactive) level range, with its voltage varied between an accepted high range of the "old" channel units, so as to transmit additional analog or digital information to the CUs. The "old" CUs remain active when the RNDIS bus is maintained within the defined HIGH voltage level. "Low" preferably still indicates the disable signal.

"New" CUs are not only active when the signal is HIGH, but include additional circuitry for decoding the information now contained on the RNDIS bus, and for transmitting information to the CO via new control unit ACU-R on this-bus as well. Such information is transmitted by placing a serial digital signal in the RNDIS bus in which the voltage level is modulated within the "high" voltage level range.

Accordingly, in one embodiment the invention provides a subscriber loop carrier system for transporting a plurality of signals to subscriber locations. The subscriber loop carrier system has a remote terminal including a plurality of channel units for transmitting and receiving the subscriber signals; and a control unit operably coupled to said channel units, the control unit communicating control and monitoring information to and from the plurality of channel units, the control unit coupled to the channel units by a read disable bus (RNDIS), the read disable bus carrying the control and monitoring information between the control unit and the plurality of channel units.

A further understanding of the nature and advantages of the inventions herein may be realized by reference to the remaining portions of the specification and the attached drawings.

DESCRIPTION OF THE PREFERRED EMBODIMENTS CONTENTS

I. Terminology
II. Description of the Hardware A. Overall System Description B. Detailed Discussion
III. Description of the Software
IV. Illustrative Alternative Embodiment
V. Conclusion

I. Terminology

The following frequently used terms are intended to have the following meaning within this application:

COT — Central Office Terminal
RT — Remote Terminal
OS — Operations System
EOC — Embedded Operations Channel
CU — Channel Units
LIU — Line Interface Units
ACU — Alarm Control Unit
DLU — Data Link Unit
CTU — Channel Test Unit
TRU — Transmit/Receive Units
DSO — Digital Signal Level zero
PAM — Pulse Amplitude Modulation Bus Line
RNDIS — Read Disable Bus Line
NE — Network Element
URP — Universal Remote Provisionable Channel Unit Throughout the text, a designation of "-R" is indicative of a card which is replaced according to the retrofit system herein. For example, "LIU-R" is indicative of a retrofit LIU provided herein.

II. DESCRIPTION OF THE HARDWARE

A. Overall System Description

The present invention provides a method and device for upgrading a telecommunications SLC such as the AT&T SLC-96. The invention provides a method and device for inexpensively upgrading an existing SLC system to provide such additional functionality and effectively provide an upgrade of the SLC to intelligent network elements. All that is required is replacement of several cards. The operation provides microprocessor controlled cards which enable the RT to be remotely controlled by an operations system (OS) interface using TL1 messages for maintenance and remote provisioning. The invention upgrades the functionality provided in the current SLC system so that this equipment can be integrated into the new operations systems as Network Elements (NE).

The retrofit involves the change-out of several common cards and channel units which can be done with a nominal interruption to service. Access to the system for remote features can reside at the central office or this access may be extended with modem or X.25 channel to remote regional centers where the advanced OS's reside.

After adding the common cards to the SLC-96, telephone operating companies may use new channel units such as the universal remote provisionable (URP) channel units in place of conventional channel units. These dual-circuit multi--function channel units provide software controlled remote provisioning for special service applications.

The interface to the OS employs an embedded operation channel (EOC) using non-proprietary message sets (TL1/ASN-1). These messages provide for remote provisioning, testing, and performance monitoring. The EOC uses one of the DSO channels from a DS1 and interfaces with the OS by way of a standard data channel unit in the central office terminal (COT).

In-service performance monitoring of the SLC-96 is greatly enhanced by the system described herein. Currently, the SLC-96 monitors the T1 lines for Bipolar Violation (BPV) to determine the Bit Error Rate (BER) used to activate the Automatic Protection Switch (APS). The improved system herein monitors several additional parameters. Error counts are stored in registers, which can be retrieved regularly or on-demand. Monitored performance parameters are listed in Table 1. Additional parameters may be readily added using means readily understood by those of skill in the art. These enhancements of in-service monitoring lower trouble calls and allow the phone company to take action before the degradation affects service.

TABLE 1

| T1 Performance Parameters Monitored |
|---|
| Near End: |
| Bipolar Violation Count (BPV) |
| Errored Second Count-Line (ESL) |
| Errored Second Count-Path (ESP) |
| Severe Errored Framing Second (SEFS) |
| Severe Errored Second Count-Path (SESP) |
| Far End: |
| CRG Violation Count Line (CVL) |
| ESL |
| ESP |
| SEFS |
| SESP |

TABLE 1-continued

T1 Performance Parameters Monitored

Controlled Slip Second (CSS)

One of the major benefits of the system described herein is the labor savings associated with the remote provisioning (transmission level, equalization, and balance) of voice special service channel units. This is accomplished by microprocessors on common (ACU-R, LIU-R, DLU-R, and LSU-R) cards which interpret the OS messages from the EOC or craft interface, thus remotely setting the intelligent new channel units.

The URP channel unit is a dual 2-wire voice circuit channel unit which can handle all loop-start, ground-start, and loop-reverse battery applications. It has the range of D4 single-circuit special channel units which are currently used for these applications. At the same time, the system works with standard dual-circuit SPOTS/POTS channel units in the SLC-96 central office terminal. The URPs do not interfere with installed POTS or other D4 voice special channel units, or dataports in the same remote terminal. Use of the dual-circuit URP channel unit instead of the single-circuit D4 special channel units saves a time slot.

By doing the above, the retrofitted SLC will have better performance monitoring, remote provisioning, and will gain a circuit for future growth for each D4 CU replaced.

The system described herein also increases craft productivity over SLC-96 during out-of-service testing. Existing D4 special service channel units used in the SLC-96 do not have test-access relays. This means that there is no way to sectionalize these circuits when they are used at the Remote Terminal (RT). Test access relays are preferably built into the new CUs herein. When they are used at the remote terminal, these splitting relays can be activated by messages from the craft interface or by messages from the operation systems. This means that testing can be software controlled from the remote regional center without sending the craft person to the RT.

The specific embodiment of the invention herein supports the following system attributes, although others will be readily apparent to those of skill in the art:

OS messages to provide system identification, store physical location data, alarm and status reporting, pre-installed circuit turn-up; and the remote provisioning of gain, equalization, and balance.

Enhanced performance Monitoring on all DSi's.

B. Detailed Discussion

Figure 2:
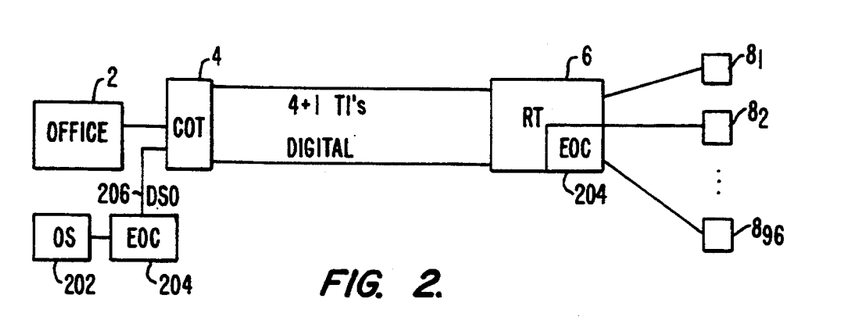
FIG. 2 is an overall illustration of the system herein.

FIG. 2 illustrates a typical SLC channel bank modified according to one aspect of the invention. Referring to this figure, one or more information lines (T1) provide two-way communications between the COT 4 and the RT 6. Communications to the COT may be from any analog or digital office 2. The RT according to this aspect of the invention may interface with OS 202 via EOC 204 over a DSO channel 206.

Figure 3:
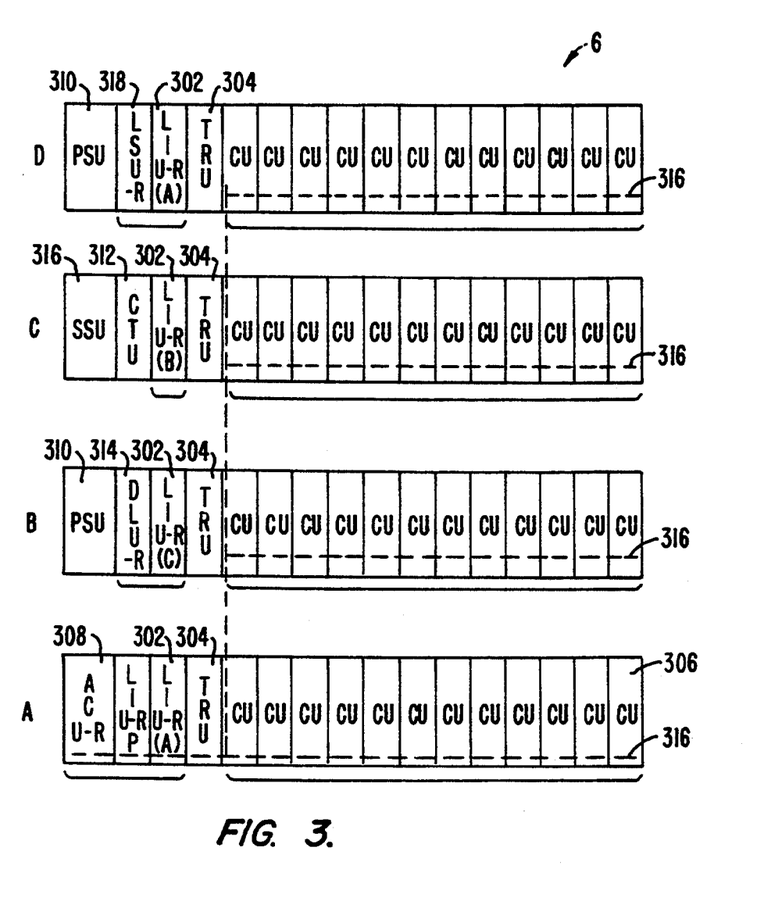
FIG. 3 illustrates the physical card layout.

FIG. 3 illustrates the upgraded SLC RT 6 in greater detail. Portions which are replaced to perform the upgrades herein are indicated with brackets. The T1 lines interface with line interface units (LIU-Rs) 302 which communicate with one or more transmit/receive units (TRUs) 304 which then interface and communicate with a plurality of upgraded channel units 306. All systems operate under the control of the new main controller or ACU-R 308. The ACU-R contains the central processor and the database of the system.

Specifically, the ACU-R performs system master controller functions; maintains a database on card types, configurations, options, operation states, and user profile; processes and generates SLC-96 derived data link (DDL) application messages; processes and generates maintenance, administration TL1 messages on a DSO channel (EOC); provides a RS-232 craft/OS interface on its front panel; and provides protecting switching control. Additionally, the ACU-R interfaces to the CU through the DLU-R to perform CU testing by emulating the current signals; provides system alarm processing; provides time stamps on messages; and provides synchronization control. Using means well known to those of skill in the art, the ACU-R can readily be modified to perform additional functions of, e.g., maintaining a cross-connect map when an optional time slot interchange is present; providing a second RS232 port for daisy chain of multi-RT installations; monitoring remote terminal failure conditions; providing visual indicators for alarm status on the front panel; and processing/ generating maintenance and administration ASN.1/CMISE messages on a DSO Channel (EOC).

The LIU-Rs 302 monitor the T1 line performance, detect T1 line trouble conditions, report threshold crossing to the ACU-R, and report/clear trouble conditions to ACU-R such as LOS/OOF/AIS/BER/Yellow Alarm line, line loop-back and bank loop-back. The LIU-Rs also inserts per channel trunk processing code (A/B Signalling Bits) towards CUs during CGA. Additional options can be provided by those of skill in the art. For example, the LIU-R may monitor the far-end performance with ESF.

The LSU-R 318 performs the functions of automatic protection switching (APS) with the ACU-R and the protection DS1. The LSU-R also provides four shorting plugs on the front panel for disabling the APS. Using means well known to those of skill in the art the LSU-R may also be modified to support SLC-96 Mode II operation, dynamic time slot interchange (crossconnect), provide insertion/extraction of TR-303 TMC messages into/from the DS1 bit stream, detect/insert in-band signalling for call processing; detect/insert LAPD messages and In-Band signalling, and translate between LAPD messages and In-Band signalling.

DLU-R (Date Link Unit) 314 provides an interface between the ACU-R and CTU. In addition, the DLU-R provides data communication signal path between ACU-R and LSU-R slot.

PUs 310 (Power Units) provide power to the system as per a conventional SLC-96. CTU (Channel Test Unit) 312 performs the function of conventional channel test units. SSU (Special Service Unit) 316 performs the function of a conventional SLC-96 SSU.

The URPs 304 can be used to replace 2-wire voice special D4 channel units and SPOTS, with LS/GS/LRB/TO applications. They are provisioned by TL1 messages for gain, equalization, and balance; testing with CTU and the PGTC; and, optionally, perform testing with the RTU and TL1/ASN-1 messages. Messages are communicated over RNDIS bus line 316.

The system also provides for use of the prior channel units; the system is backward compatible. When a conventional CU is inserted into one of the slots, the system detects them being inserted into/removed from the slot.

Figure 4:
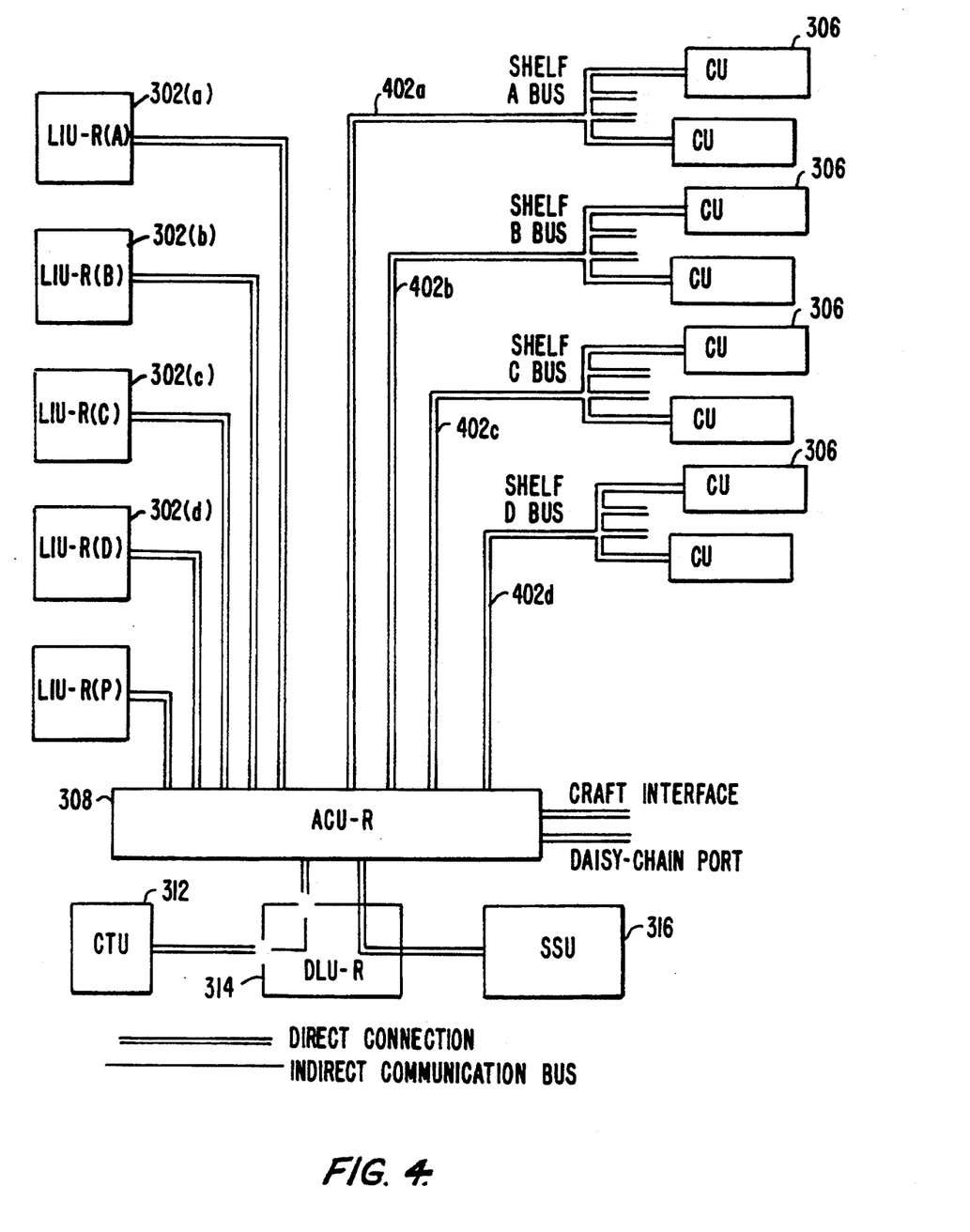
FIG. 4 illustrates the communication architecture of the retrofitted system.

FIG. 4 schematically illustrates major features of the communications architecture of the SLC-96R system disclosed herein in greater detail. As shown, the four groups of CUs each communicate with the rest of the system via the ACU-R over buses 402a, 402b, 402c, and 402d, respectively. Separate communication lines are provided for communication of the ACU-R to the LIU-R's 302. ACU-R 308 communicates via still separate bus lines to the CTU 312 (via the DLU-R 314) and via still other bus lines to the SSU 316, via the DLU-R 314. Lines are also provided for interface to a craft interface, and a daisy-chain port. The invention herein provides for the use of a conventional SLC-96 RT back plane, as well as TRU, PU, SSU, and CTU, along with conventional channel units.

The channel units are divided into four sets of 12 as shown, with each set being served by a dedicated LIU-R TRU pair. The backplane of the RT provides for several buslines between the common cards and each set of CUs. These bus lines include read disable (RNDIS), transmit and a receive pulse amplitude modulation (PAM), clock (CLK), A/B signaling, and pulse code modulation (PCM). According to the invention herein the RNDIS bus is used for transmitting additional information in a serial fashion between the ACU-R and the CUs. The read disable function continues to be performed by variation of the voltage level within previously defined high and low levels.

The RNDIS bus' normal function is to disable all CUs served by a failed T1 line. This function is achieved by providing the RNDIS bus with two voltage level ranges, e.g., a LOW voltage level range (zero to 1 volt) and HIGH voltage level range (e.g., 2.8 to 5 volts), with the HIGH voltage level being used to maintain all CUs active, and a LOW voltage level indicating to logic on the CUs to disable themselves since a failure condition exists. According to the invention, the RNDIS bus is maintained at a HIGH (or inactive) voltage level range, when it is desired to provide an inactive read disable signal, but its voltage is varied between 2.8 and 5 volts to transmit information to and from the "new" CUs. The "old" CUs remain active (e.g., working) when the RNDIS bus is maintained within the defined HIGH voltage level range. The "new" CUs not only remain active but include additional circuitry for decoding the information now contained on the RNDIS bus and transmitted within the defined HIGH voltage level range, and for communicating with the common cards on this bus as well. According to the invention, the failure condition is indicated to both old and new CUs through the use of a low voltage level.

The enhanced features described herein are obtained by replacing or adding the bracketed cards shown in FIG. 3, which include the LIU-R, the DLU-R, the ACU-R, the LSU-R and the new CUs, such as URPs. The software necessary for operation of the system resides in the replacement cards and in the craft interface software.

An interface to the operations system is provided by the system in preferred embodiments, as shown in FIG. 4. Transaction Language 1 (TL1) application messages are used to support this interface. One of 2 RS-232C jacks on ACU_R front panel is used to provide the physical connection for this OS interface. A single circuit D4 Data Port is connected to the ACU_R front panel jack. In a preferred embodiment, the LSU-R is used to gain access to the DS0 channels, eliminating the need for the D4 data port at the RT. Daisy chain control of up to 4 SLC96R installations using 1 DS0 channel can be provided, as shown in FIG. 4. When this control mode is utilized, front panel connections between different ACU_Rs are necessary.

The craft interface device (CID) interfaces with the system through an RS-232C front panel jack at the ACU-R. The interface messages used between the CID and ACU-R are the same TL1 messages supported by the system. User-friendly windowing software preferably enables the user to control and monitor the SLC-96R without detailed knowledge of TL1 language. Commands from the user are translated into TL1 messages to system and messages (responses or autonomous information) from the system are translated into display format for users.

Figure 5:
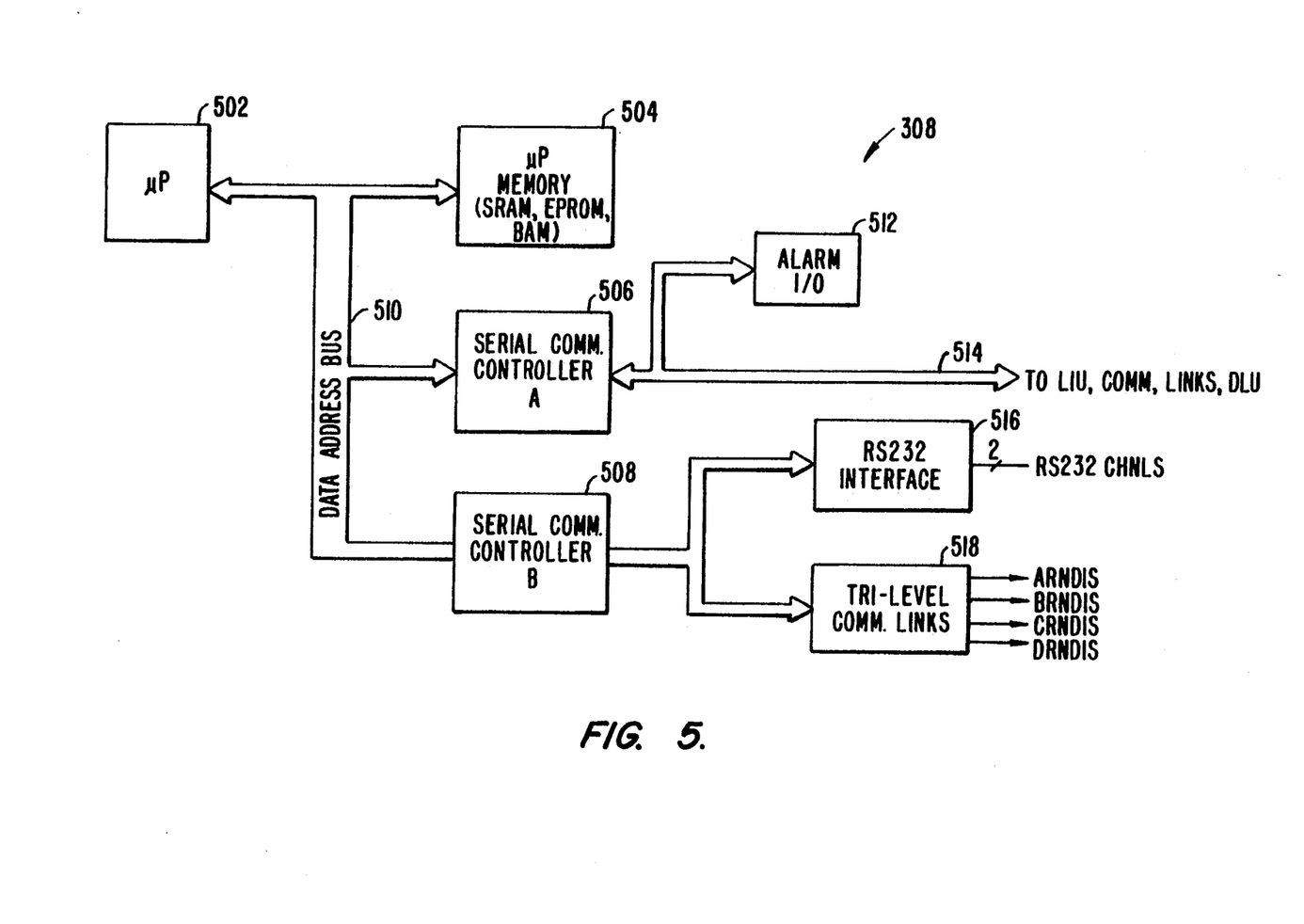
FIG. 5 is a circuit block diagram illustrating the ACU-R.

FIG. 5 is an electronic block diagram illustrating the ACU-R 308 in greater detail. As shown therein the ACU-R operates to perform the functions described elsewhere herein under the direction of a conventional microprocessor 502. The microprocessor is operated under the direction of a program stored in memory 504 and stores various items in memory 504. Memory 505 may include one or more of ROM, SRAM, DRAM, EPROM, and battery backed-up RAM. The microprocessor operates two serial communications controllers 506 and 508 as well as memory 504 over bus lines 510.

Serial communication controller A 506 provides input and output to alarm input/output device 512 and communicates with LIU-R, DLU-R, LSU-R, and communication links over bus lines 514. Serial communication controller B provides a communication link to RS232 interface 516 and trilevel communication link 518. Trilevel communication link 518 interfaces with each of the four read disable lines (RNDIS) associated with each of the four shelves to perform the functions described elsewhere herein.

Figure 6:
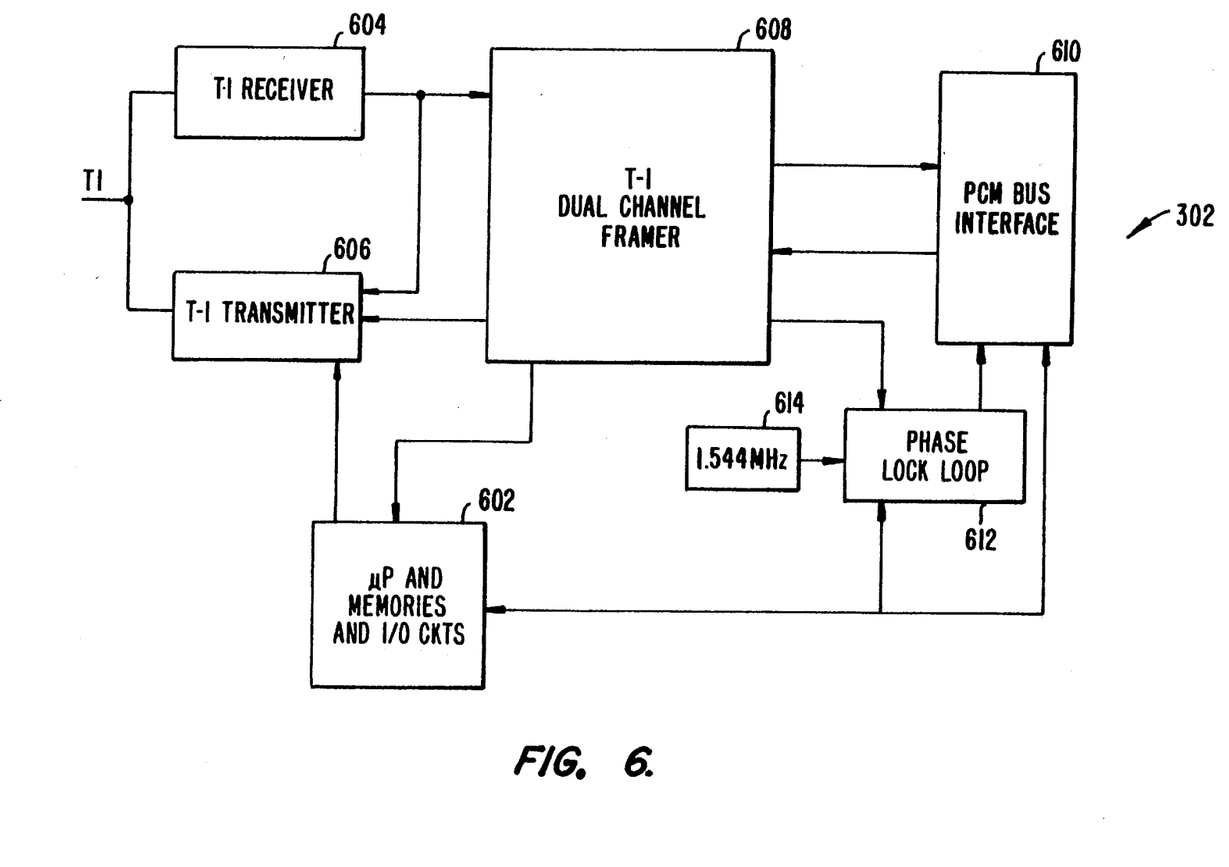
FIG. 6 is a circuit block diagram illustrating the LIU-R.

FIG. 6 is a circuit block diagram of the LIU-R. As shown therein, the LIU-R operates under the direction of a microprocessor 602, based on software stored in memory associated therewith. T1 lines are placed in communication with T1 receiver 604 and T1 transmitter 606. Signals are placed on and received from the T1 lines using T1 dual channel framer 608 based on signals received from PCM bus interface 610. A phase lock loop 612, operating under either the inputs of 1.544 MHz clock 614 or the recovered clock from T1 lines via the T1 channel framer 608 and which is selected under the control of the microprocessor, provides the necessary input for operation of the PCM bus interface 610.

Figure 7A:
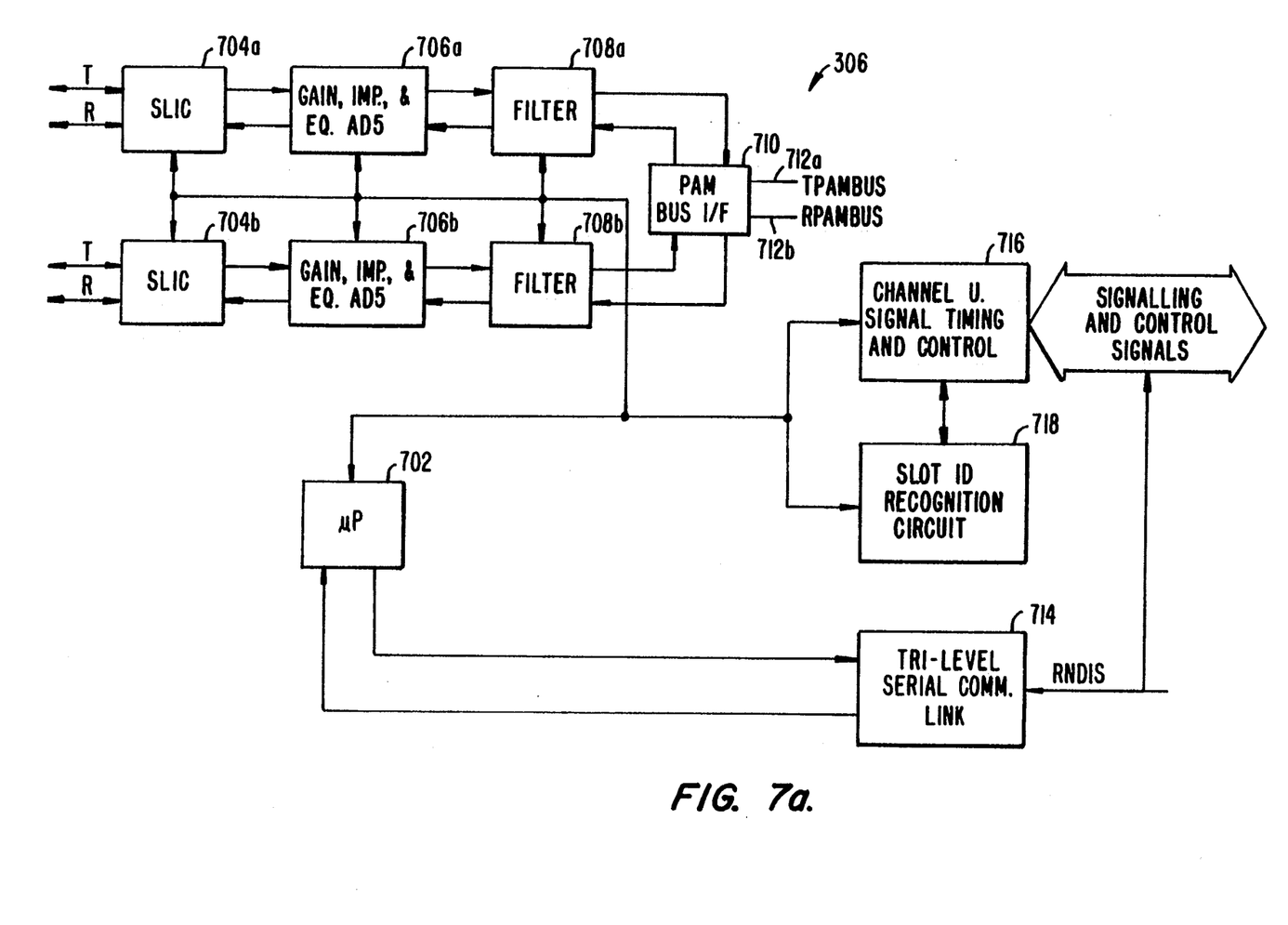
FIG. 7a is a circuit block diagram illustrating a new channel unit (URP)

FIG. 7a is a circuit block diagram of a representative replacement or "new" CU, the URP. As shown, the CU operates under the direction of a microprocessor 702. Signals from subscriber facilities are received/transmitted by conventional subscriber line interface circuits (SLICs) 704a and 704b. Signals provided to the SLICs from the system and transmitted to the system are impedance adjusted, transmission level adjusted, and have equalization adjustments performed by appropriate circuitry 706a and 706b. Signals are filtered using filters 708a and 708b. Signals are converted to a PAM format for use in the system in PAM circuitry 710 for transmission/receipt over transmit and receive PAM bus lines 712a and 712b.

Microprocessor 702 receives and transmits information via a trilevel serial communications link 714 from the RNDIS bus. Based on the information received, microprocessor 702 performs necessary adjustments and monitors the SLICs 714, the adjustment circuitries 706, and the filters 708. Circuitry 716 provides and receives timing and control information, including the disable function provided by a low level RNDIS. Slot ID recognition circuit 718 provides the ability to determine which slot in the channel bank is filled by this URP.

Figure 7B:
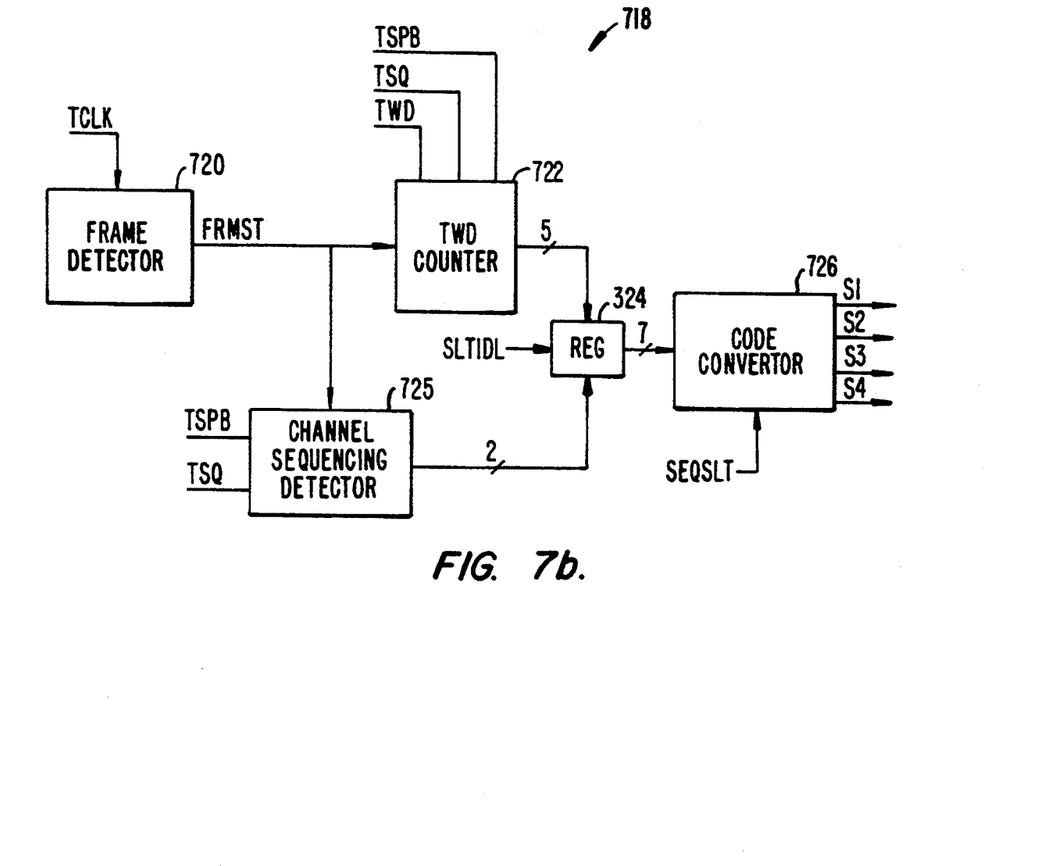
FIG. 7b illustrates the slot id recognition circuit in greater detail.

FIG. 7b illustrates the slot id recognition circuit (SIR) 718 in greater detail. The SIR uses five signals from the SLC-96 backplane, i.e., TCLK, TWD, TSQ, TSPA, and TSPB. TCLK is a 1.544 MHz digital signal with a missing pulse at the start of the DS-1 frame. The TWD is a 192 KHz digital signal. TWD is high for approximately 1.2 $\mu$S and low for 4 $\mu$S.

TSQ can have two forms. In the D1D channel sequencing TSQ will have 6 pulses per 125 $\mu$S cycle and these pulses are grouped together with 5.2 $\mu$S highs and 5.2 $\mu$S lows. In D4 channel sequencing there is only one pulse per 125 $\mu$S and it is high for 31.25 $\mu$S. TSPA and TSPB, like the TSQ, can have two forms depending on the channel sequencing used. TSPA is a timing signal used by the odd channel on the URPS and TSPB is used by the even channel. TSPA and TSPB both have the same form and the only difference is that one is time shifted with respect to the other. In DiD sequencing the TSPs have 2 pulses per 125 $\mu$S. Each pulse has a 10.4 $\mu$S high level and 52.1 $\mu$S low level. TSPB goes high right after TSPA has gone low. In D4 sequencing, the TSPs have 4 pulses per 125 $\mu$S. Each pulse is 5.2 $\mu$S high and 26 $\mu$S low. TSPB goes high right after TSPA goes low.

SEQSLT is generated by the microprocessor on the URP. When SEQSLT is low, the microprocessor is asking for channel sequencing information from the SIR. When SEQSLT is high, the microprocessor is asking for slot location information from the SIR.

The SIR generates four output signals. They are SLOT.0, SLOT.1, SLOT.2, and SLOT.3. When SEQSLT is high, these 4 signals will provide the slot location (1-12) of the URPS in a 4 bit binary code number. When SEQSLT is low these 4 signals will either be all high for D1D sequencing or all low for D4 sequencing.

With the existing SLC-96, for any channel unit plugged into a shelf, the channel unit will detect a condition where all of TSPB, TSQ and TWD are high at the same time. The moment when this condition occurs, with respect to the DS-1 125 $\mu$S cycle, is unique on the time line for each channel unit on each physical slot. Therefore, by counting the number of TWDs between the start of the DS-1 frame and the instant when TSPB, TSQ, and TWD are high will give a unique count number for a URPS in a particular slot of a SLC-96 shelf.

The SIR includes a frame detector 720. The frame detector is implemented by utilizing a retriggerable monostable multivibrator such as a 74123 type. Its input is TCLK and its output FRMST is a signal used by other functional blocks. FRMST is a pulse that is active once every 125 $\mu$S and is aligned with the beginning of the T1 frame.

A TWD counter 722 is implemented by utilizing a 7-stage binary counter such as a 744024 type. It counts the number of pulses on the TWD signal and it is reset by the FRMST pulse. The output of this counter (5 bits) together with the output from the channel sequencing detector 725 (2 bits) are latched into an eight bit register 724 by a signal called SLTIDL. SLTIDL is obtained by ANDing TWD, TSQ, and TSPB. The output of this register (7 bits) is the input to the code convertor 726.

The channel sequencing detector 725 is implemented with a set of D flip flops with preset and clear such as a 7474 type. These flip flops detect whether a positive or negative edge is present on the TSQ signal during the time when TSPB is "1." This detection is also reset by the FRMST signal. For a D1D sequence, one of the two outputs will be active. For a D4 sequence, these outputs will be inactive.

The code convertor 726 is implemented by utilizing a PLD such as a 22v10 type. This circuit uses the inputs from the TWD counter and the channel sequencing detector to convert the TWD counting information and the sequence information to the physical slot position information which is readable by a microprocessor.

Figure 8:
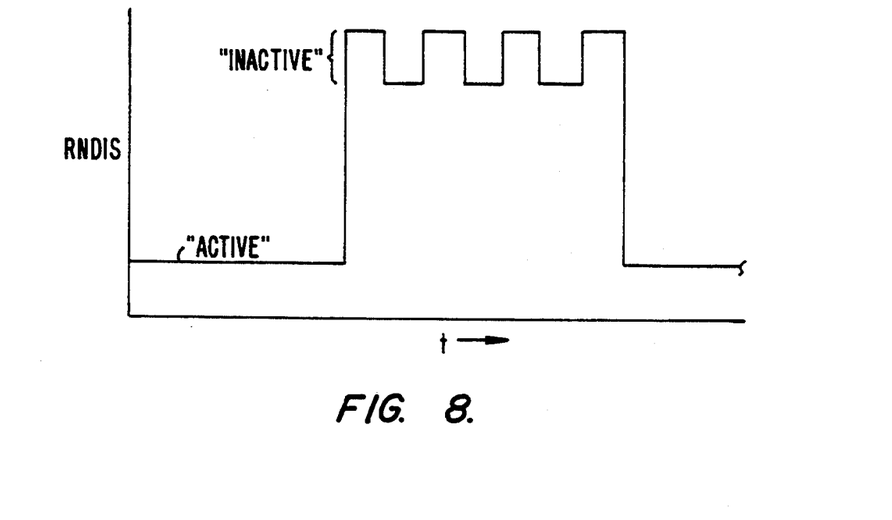
FIG. 8 illustrates an RNDIS bus signal.

FIG. 8 is a diagram illustrating a representative RNDIS signal according to the invention. As shown, the signal is normally at a "high" voltage level. This will enable conventional CUs to continue to operate. Within the accepted definitions of "high" the signal is modulated to provide communication of the relevant information described above to/from the CU. Accordingly, while staying within the "high" level standard, serial digital data communication is conducted over the RNDIS bus line. When the line returns to a low level, this provides an appropriate indication of a failed T1 line.

III. DESCRIPTION OF THE SOFTWARE

Figure 9:
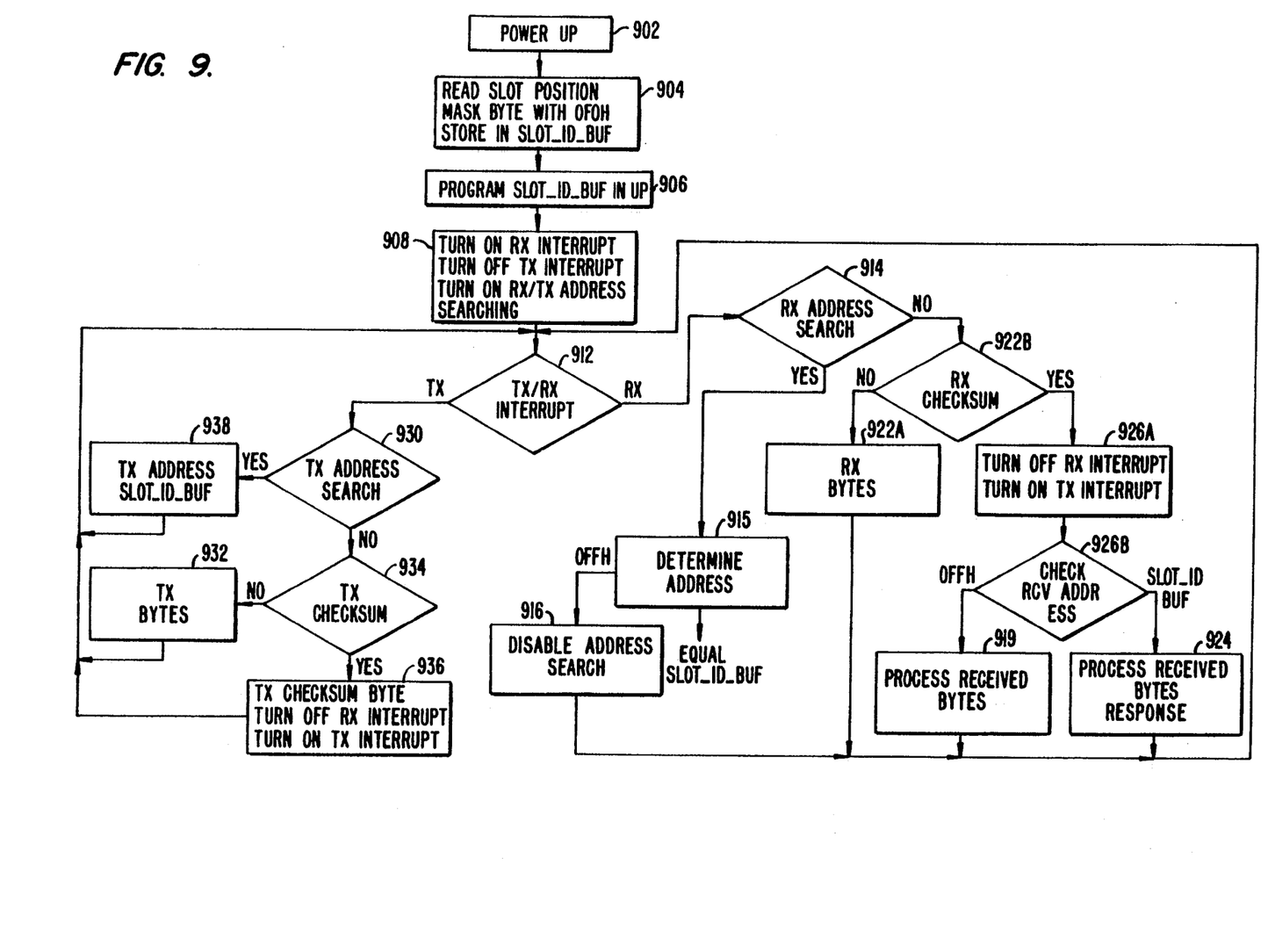
FIG. 9 is a flow chart illustrating operation of the URP/ACU-R interface.

FIG. 9 is a flowchart illustrating the URP and ACU-R interface. Upon turning the system on, the URP proceeds through a power-up initialization process 902. At step 904 the system reads a slot position of the URP from its assigned I/O port. The high byte is masked with the sequence OFOH and stored in a location referred to as SLOT_ID_BUF.

At step 906 the system programs the SLOT_ID_BUF into the microprocessor. After the SLOT_ID_BUF is programmed the microprocessor will generate a receive interrupt only if incoming byte matches the SLOT_ID_BUF or if it matches a universal address FFh.

At step 908 the system initially enables a flag for a receive interrupt, turns off a flag for a receive interrupt, and enables transmit/receive searching. The system then begins a normal operational loop.

At step 912 the program performs a check to determine if the transmit or receive interrupt flag is set and, in the first time through the loop, the receive flag will be set. At step 914, a received byte is checked to determine whether it is an address byte or a byte in a message. If it is an address byte then the system goes to step 915. If it is a message byte then the system goes to step 922B. At step 915 the program determines whether the received address is a universal address OFFh or the same as SLOT_ID_BUF, then disables address search at step 916 and cycles back to step 912. At step 922B the system determines whether the received byte is checksum. If yes, it turns off the receive interrupt flag and turns on the transmit interrupt flag and goes to step 926A. If not, it receives more message bytes and cycles back to step 912. At step 926B, after the entire message is received, the system determines if the associated message address is either FFh or SLOT_ID_BUF. If the address matches FFh, the system processes the received message at step 919 and cycles back to step 912. If the address matches SLOT_ID_BUF, the system processes and responds to the received message at step 924 and cycles back to step 912.

At step 912 when the transmit interrupt flag is set the system then determines if the transmit address search is enabled at step 930. If yes, the system transmits the address byte in SLOT_ID_BUF at step 938. If not, the system performs a check if transmits checksum is enabled at step 934. If yes, it transmits checksum, turns off the transmit interrupt flag, and turns on the receive interrupt flag at step 936 then cycles back to step 912. If not, it transmits more bytes and cycles back to step 912.

Figure 10:
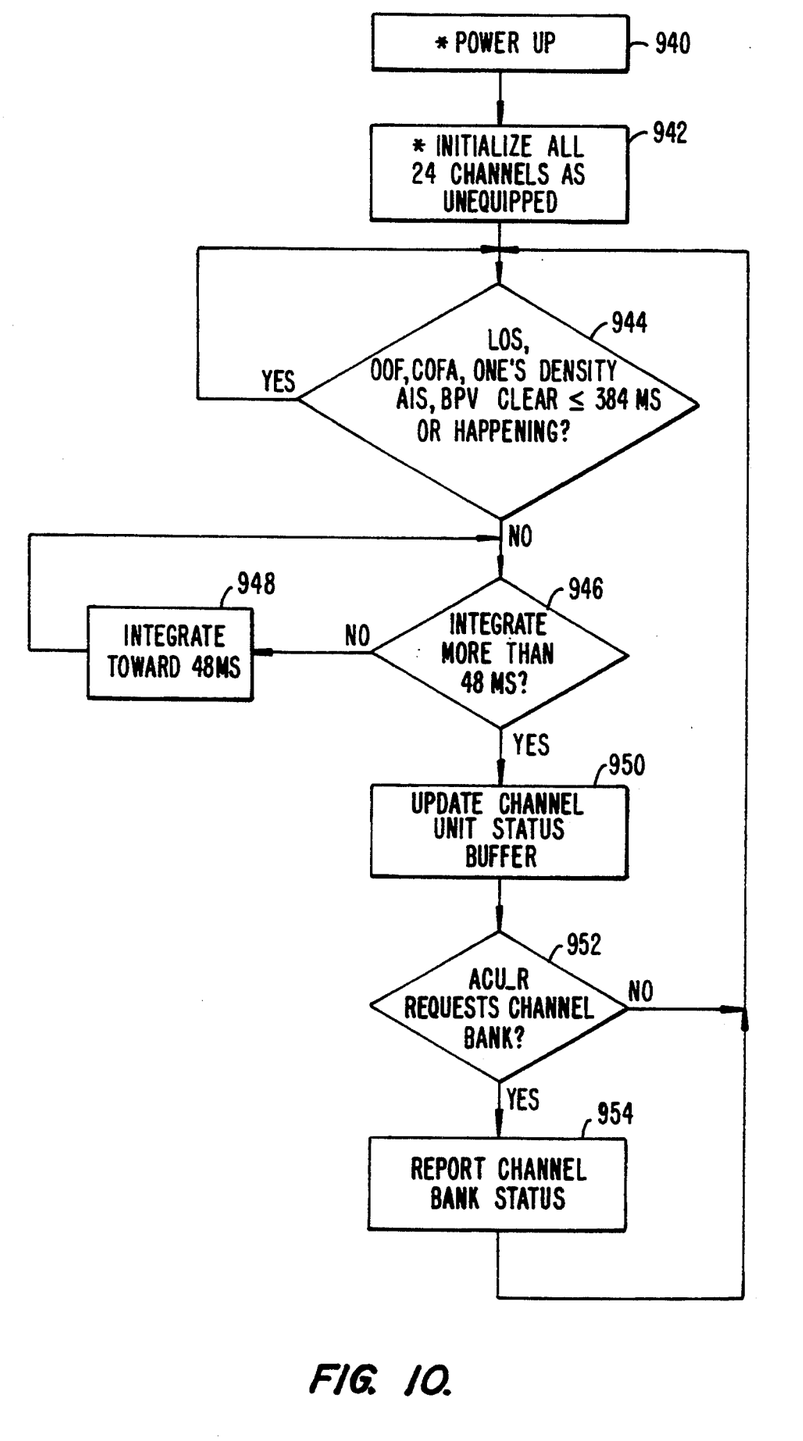
FIG. 10 is a flow chart illustrating operation of the LIU-R operation for new CU status reporting.

FIG. 10 is a flowchart of the software in the LIU-R which handles the new CU (URP) status reporting. As shown, at step 940 the LIU-R performs a power-up sequence when the system is turned on. At step 942 the system initializes all 24 channels on the row in question as "unequipped." At step 944 the system checks to determine if any T1 error conditions exist on the line. If the answer in step 944 is affirmative, the system repeats step 944 until the answer is not affirmative, at which time the system determines at step 946 if there has been an integration for more than 48 ms and, until this occurs, continues integrating at step 948. After 48 ms of integration, the system updates the channel unit status buffer by reading the A/B bits and PCM bits of each DS0 channel from the T1 framer at step 950 and at step 952 determines if the ACU-R has requested information from the channel unit. If so, the system reports the channel unit status to the ACU-R at step 954 and returns to step 944. If not, the system returns to step 944.

Figure 11:
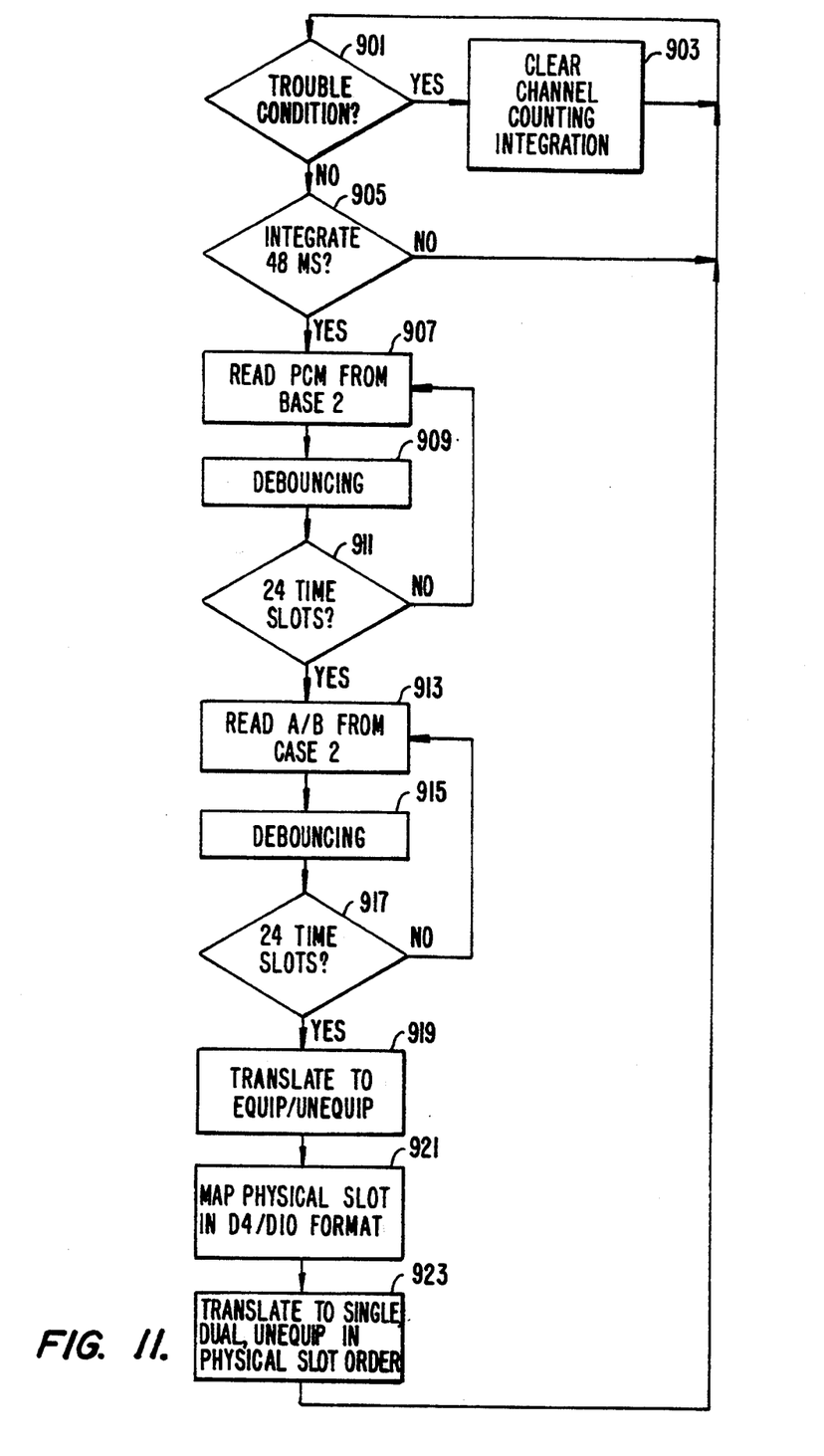
FIG. 11 illustrates the LIU-R software operation for CU detection and dual/single channel type determination.

FIG. 11 illustrates the LIU-R software logic for detection of channel unit insertion and removal, and determination of dual circuit or single circuit channel unit. As shown, at step 901 LIU-R determines if there is any trouble condition detected on the interface with TRU common card in the subscriber loop carrier system. If so, at step 903 LIU-R clears a channel counting integration timer and returns to step 901. If not, at step 905 LIU-R determines if the integration timer of 48 msec has been reached, and if not, the system returns to step 901. If the integration timer of 48 msec has been reached, LIU-R reads the PCM signal from the framer chip at step 907 and at step 909 performs a debouncing procedure. At step 911 LIU-R determines if the process has been performed for all 24 time slots, and until it has, returns to step 907.

After the PCM signal for all 24 time slots have been read, LIU-R reads the A/B signalling bit information from the framer chip at step 913, and at step 915 performs a debouncing procedure. At step 917 LIU-R checks to determine if this sequence has been performed for all 24 slots, and repeats to step 913 until it has. After the signalling bit information for all 24 time slots have been read, LIU-R determines if each of the time slots is occupied or not using an algorithm as shown in Table 2. At step 921, the time slots information is mapped into physical shelf slot position information taking into consideration the time slot sequencing format (D1D/D4) that is currently being used for the shelf. At step 923, LIU-R formats the information into an internal format for reporting to ACU-R; the information indicates whether the slot is equipped with a single circuit channel unit, a dual circuit channel unit, or not equipped at all.

TABLE 2

| | LIU-R Decision Table | | | |
|---|---|---|---|---|
| | Signalling | | | |
| Channel | A | B | PCM | Conclusion |
| N | 1 | 1 | 1111 1111 | Unequipped Box |

TABLE 2-continued

| | LIU-R Decision Table | | | |
|---|---|---|---|---|
| | Signalling | | | |
| Channel | A | B | PCM | Conclusion |
| N + 1 | 1 | 1 | 1111 1111 | |
| N | x | x | not all 1s | Single Cir. CU |
| N + 1 | 1 | 1 | 1111 1111 | |
| N | x | 0 | xxxx xxxx | Dual Cir. CU |
| N + 1 | x | 0 | xxxx xxxx | |
| N | 0 | x | xxxx xxxx | Dual Cir. CU |
| N + 1 | 0 | x | xxxx xxxx | |
| N | x | 0 | xxxx xxxx | Dual Cir. CU |
| N + 1 | 0 | x | xxxx xxxx | |
| N | 0 | x | xxxx xxxx | Dual Cir. CU |
| N + 1 | x | 0 | xxxx xxxx | |

"x" indicates a don't care condition

Figure 12:
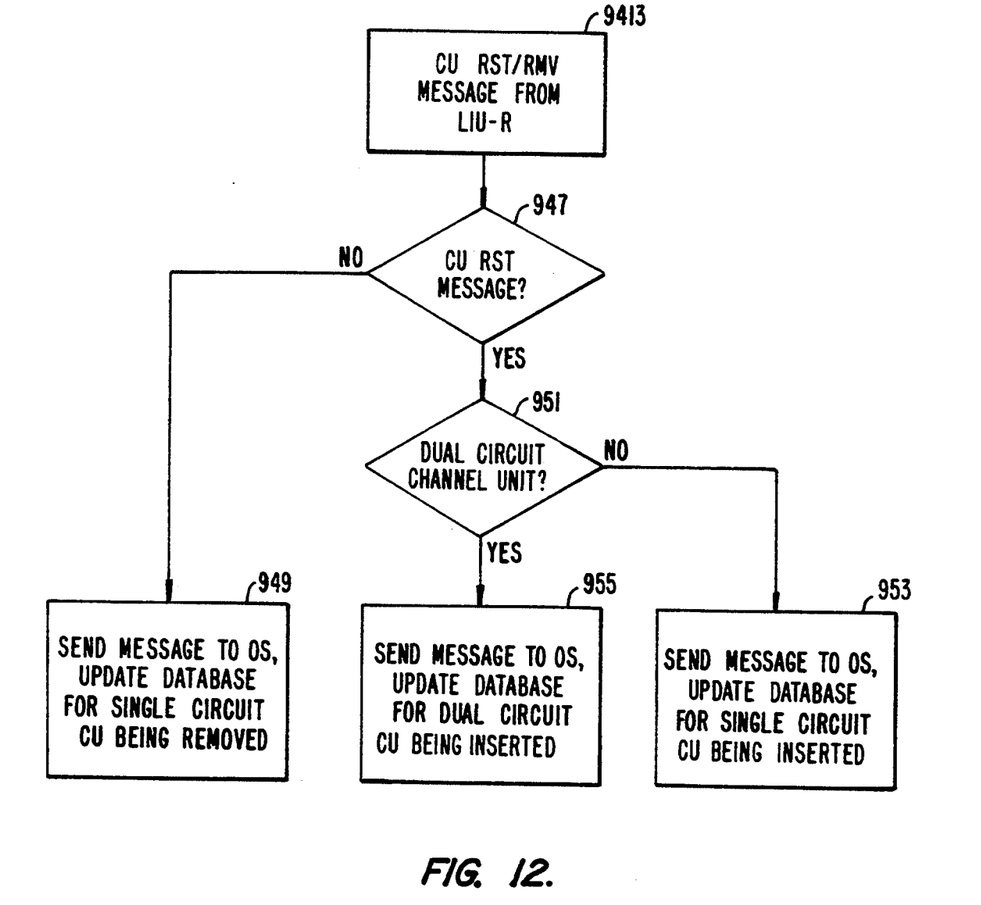
FIG. 12 illustrates the ACU-R/LIU-R communication software operation for CU insertion and for CU removal and identification.

FIG. 12 illustrates the ACU-R software logic which communicates with the LIU-R software for detection of channel unit restoral/removal from the subscriber loop carrier system. At step 943 the ACU-R waits for a message from LIU-R that indicates channel unit restoral/removal (CU RST/RMV). At step 947, upon receipt of the CU RST/RMV message from LIU-R, ACU-R processes the message to determine if this is a channel unit being inserted (CU RST) or channel unit being removed (CU RMV). If a channel unit is being removed from the system shelf, ACU-R transmits a message to the Operations System (OS) data link interface and updates ACU-R's internal database at step 949 to indicate such condition. If a channel unit is being inserted into the system shelf, ACU-R determines from the LIU-R message if this is a dual circuit channel unit or a single circuit channel unit at step 951. At step 953, ACU-R determines that the channel 5 unit is a single circuit channel unit; ACU-R then transmits a message to the Operations System (OS) data link interface and updates ACU-R's internal database to such restoral condition. At step 955, ACU-R determines that the channel unit is a dual circuit channel unit; ACU-R then transmits a message to the Operations System (OS) data link interface and updates ACU-R's internal database to such restoral condition.

Appendix 1 (© Copyright 1991, Able Telecommunications, Inc. All Rights Reserved.) provides representative C language software (80188 family) for the ACU-R. Appendices 2 and 3 (© Copyright 1991, Able Telecommunications, Inc. All Rights Reserved.) provide representative assembly language software (8051 family) for the URP and LIU-R, respectively.

IV. ILLUSTRATIVE ALTERNATIVE EMBODIMENT

The equipment described herein can readily be retrofitted to a fully functional SLC-96R that conforms to the Integrated Digital Loop Carrier (IDLC) system of the Bellcore TR-303 standard. The remote terminal becomes a single-ended system and the central office terminal is no longer needed.

This embodiment of the invention uses hybrid signalling through a DS0 channel, which is designated the time-slot management channel (TMC). This provides integration of a single-ended loop carrier system with a local digital switch (LDS) that supports TR-303.

The EOC uses another one of the DS0 channels and works with multiple OS's at the central office with an X.25 interface via the local digital switch.

According to this embodiment of the invention, the system will, as an option, be able to daisy-chain four co-located remote terminals (in a type 80 Community Service Cabinet) so that only one EOC channel and only one TMC channel is required. This will be accomplished by using an 8-pin RS-232-C connector on the faceplate of each of the ACU-Rs.

According to this embodiment of the invention, there will be a true time-slot-interchange (TSI). With this TSI, any of the 96 channels has full access to all the DSO's in the four T1s thus providing a digital crossconnect function and concentration at the remote terminal. This provides more flexibility than the 2:1 concentration provided by the current SLC-96 Mode II in which each group of 48 channels has access only to the DSOs in one T1.

The system herein is compatible with any ISDN Channel Unit that uses the 3-DSO method to transport 2B+D. It will also be possible to implement an optional ISDN BRA channel unit, using the 4:1 time-division-multiplexing (TDM) method. This channel unit will multiplex the small d's, small eoc's and other overheads of the DSL's into a separate big D channel and big EOC instead of using a full DSO channel for each small d channel for this purpose.

V. CONCLUSION

It is seen that the present invention provides a substantially improved method and device for performing monitoring and remote provisioning of a SLC. The above description is illustrative and not restrictive. Many variations of the invention will become apparent to those of skill in the art upon review of this disclosure. Merely by way of example, the invention may be used with substantially different specific pieces of hardware or substantially different software sequences, or the role of hardware and/or software may be interchanged without departing from the scope of the invention herein. The scope of the invention should, therefore, be determined not with reference to the above description, but instead should be determined with reference to the appended claims along with their full scope of equivalents.

What is claimed is:

1. A subscriber loop carrier system for transporting a plurality of signals originating from a central office terminal to subscriber locations coupled to a remote terminal, said remote terminal comprising:
  a plurality of channel units for transmitting and receiving said subscriber signals; and
  a control unit operably coupled to said channel units, said control unit communicating control and monitoring information to and from said plurality of channel units, said control unit coupled to said channel units by a read disable bus (RNDIS), said read disable bus communicating said control and monitoring information between said control unit and said plurality of channel units by modulating a voltage level on said RNDIS bus within a predefined high voltage level.

2. A subscriber loop carrier system for transporting a plurality of signals originating from a central office terminal to subscriber locations coupled to a remote terminal, said remote terminal comprising:
  a plurality of channel units for transmitting and receiving said subscriber signals, said channel units each comprising means for recognizing its physical slot location; and
  a control unit operably coupled to said channel units, said control unit communicating control and monitoring information from and to said plurality of channel nits, wherein each of said channel units is adapted to communicate said physical slot information to said control unit.

3. A subscriber loop carrier system for transporting a plurality of signals originating from a central office terminal to subscriber locations coupled to a remote terminal, said remote terminal comprising:
  a plurality of channel units for transmitting and receiving said subscriber signals;
  a control unit operably coupled to said channel units, said control unit communicating control and monitoring information from said plurality of channel units; and
  a line interface unit also coupled to said control unit and said channel units, said line interface unit interfacing with T1 transmission lines and monitoring whether said channel unit is a single or dual channel unit.

4. The subscriber loop carrier system as recited in claim 1 wherein said system transmits said monitoring and control information over said RNDIS bus in a serial digital manner.

5. The subscriber loop carrier system as recited in claim 3 wherein said line interface unit further comprising means for communicating whether said channel unit is a single or dual channel unit to said control unit.

6. The subscriber loop carrier system as recited in claim 1 wherein said control information comprises provisioning of parameter selections for said channel units, said parameter selections include transmission level, slope equalizer, and impedance.

7. The subscriber lop carrier system as recited in claim 1 wherein said monitoring information comprises monitoring of current configuration, operating conditions, status, and inventory information of said channel units.

8. The subscriber loop carrier system as recited in claim 1 wherein said control information comprises modifying functional types of said channel units.

9. In a remote terminal of a subscriber loop carrier system for transporting a plurality of signals originating from a central office terminal to subscriber locations which are coupled to a plurality of channel units in said remote terminal, a method for communicating control and monitoring information comprising coupling said plurality of channel units to a control unit with a read disable bus line (RNDIS), said control unit communicating control and monitoring information between said plurality of channel units and said control unit over said rad disable bus (RNDIS) by modulating a voltage level on said RNDIS bus within a defined high voltage level.

10. The method as recited in claim 9 wherein said defined high voltage level is about 2.8 to 5 volts.

11. The method as recited in claim 9 wherein said control information comprises parameter selections of said channel units, said parameter selections include transmission level, slope equalizer, and impedance.

12. The subscriber loop carrier system as recited in claim 1 wherein said defined high voltage level is about 2.8 to 5 volts.

13. The subscriber loop carrier system as recited in claim 1, 2 or 9, wherein said channel units comprise of channel units that can communicate said control and monitoring information over said RNDIS bus and channel units.

14. In a remote terminal of a subscriber loop carrier system for transporting a plurality of signals originating from a central office terminal to subscriber locations, said remote terminal comprising:
- a control unit;
- a plurality of channel units for transmitting and receiving said plurality of signals, said channel units coupled to said control unit; and
- at least one line interface unit coupled to said control unit and said channel units, said line interface unit interfacing with a T1 transmission line and monitoring whether said channel unit is a single or dual channel unit.

15. The remote terminal as recited in claim 14 wherein said line interface unit further comprising means for communicating to said control unit whether said channel unit is a single or dual channel unit.

16. The subscriber loop carrier system as recited in claim 3 or 14, wherein said channel units comprise of channel units that can communicate said control and monitoring information over said RNDIS bus and channel units that cannot communicate said control and monitoring information over said RNDIS bus.

* * * * *